US012623291B2

(12) United States Patent
    Shinozaki et al.

(10) Patent No.:     US 12,623,291 B2
(45) Date of Patent:          May 12, 2026

(54) POWDER SUPPLY APPARATUS AND AM APPARATUS USING A POWDER SUPPLY APPARATUS

(71) Applicant: EBARA CORPORATION, Tokyo (JP)

(72) Inventors: Hiroyuki Shinozaki, Tokyo (JP); Junki Asai, Tokyo (JP)

(73) Assignee: EBARA CORPORATION, Tokyo (JP)

( * ) Notice:    Subject to any disclaimer, the term of this patent is extended or adjusted under 35 U.S.C. 154(b) by 463 days.

(21) Appl. No.:    18/247,755

(22) PCT Filed:    Sep. 14, 2021

(86) PCT No.:    PCT/JP2021/033678

§ 371 (c)(1),
(2) Date:    Apr. 4, 2023

(87) PCT Pub. No.:    WO2022/075013

PCT Pub. Date: Apr. 14, 2022

(65)              Prior Publication Data

US 2023/0398605 A1      Dec. 14, 2023

(30)        Foreign Application Priority Data

Oct. 6, 2020    (JP) ................................. 2020-169369

(51) Int. Cl.
    *B22F 12/52*          (2021.01)
    *B22F 10/25*          (2021.01)
                (Continued)
(52) U.S. Cl.
    CPC .............. *B22F 12/52* (2021.01); *B22F 10/25* (2021.01); *B23K 26/144* (2015.10); (Continued)

(58) Field of Classification Search
    CPC ........... B22F 12/52; B29C 64/321–329; B29C 64/255; B33Y 40/00; B65B 39/002; B65B 39/005; B65G 65/32
    See application file for complete search history.

(56)              References Cited

U.S. PATENT DOCUMENTS 5,484,004 A        1/1996  Bolz
5,720,326 A  *    2/1998  Kaneko ..................... B65B 3/14
                                                      141/172
              (Continued)

FOREIGN PATENT DOCUMENTS

JP          H06-211202 A      8/1994
JP          2001-090892 A     4/2001
              (Continued)

OTHER PUBLICATIONS

International Search Report issued in Patent Application No. PCT/JP2021/033678 dated Nov. 2, 2021.

*Primary Examiner* — John J DeRusso
(74) *Attorney, Agent, or Firm* — Chrisman Gallo Tochtrop LLC

(57)              ABSTRACT

A powder supply apparatus including a container store for storing powder therein, a supply passage for supplying powder to the container, and a valve mechanism that opens and closes the supply passage. The valve mechanism includes a valve main body movable between a first and second position, and a valve seat configured so that the valve main body is seated thereon. The valve main body includes first and second seal portions. The valve seat includes first and second seat portions on which the first and second seal portions are seated, respectively. The valve mechanism defines a space sealingly closed when the first and second seal portions are seated on the first and second seat portions, respectively. The valve mechanism includes an exhaust
                    (Continued)

passage that exhausts gas from the sealingly closed space and a pressure monitoring passage that monitors pressure in the sealingly closed space.

6 Claims, 10 Drawing Sheets

(51) Int. Cl.
| | |
|---|---|
| *B23K 26/144* | (2014.01) |
| *B23K 26/342* | (2014.01) |
| *B33Y 40/00* | (2020.01) |
| *B65B 39/00* | (2006.01) |
| *B65G 65/32* | (2006.01) |

(52) U.S. Cl.
CPC ............ *B23K 26/342* (2015.10); *B33Y 40/00* (2014.12); *B65B 39/002* (2013.01); *B65B 39/005* (2013.01); *B65G 65/32* (2013.01)

(56)          References Cited

U.S. PATENT DOCUMENTS

| | | | |
|---|---|---|---|
| 6,315,013 B1 | 11/2001 | Lardieri | |
| 2006/0266740 A1 | 11/2006 | Sato et al. | |
| 2015/0096269 A1* | 4/2015 | Tenegal | B65D 90/545 |
| | | | 53/473 |
| 2021/0371964 A1* | 12/2021 | Kobayashi | C23C 4/10 |

FOREIGN PATENT DOCUMENTS

| | | |
|---|---|---|
| JP | 2005-219060 A | 8/2005 |
| WO | 2019/005042 A1 | 1/2019 |

* cited by examiner

POWDER SUPPLY APPARATUS AND AM APPARATUS USING A POWDER SUPPLY APPARATUS

TECHNICAL FIELD

The present application relates to a powder supply apparatus and an AM apparatus using a powder supply apparatus. The present application claims priority under the Paris Convention to Japanese Patent Application No. 2020-169369 filed on Oct. 6, 2020. The entire disclosure of Japanese Patent Application No. 2020-169369 including the specification, the claims, the drawings, and the abstract is incorporated herein by reference in its entirety.

BACKGROUND ART

There are known techniques for directly fabricating a three-dimensional object based on three-dimensional data present on a computer that expresses the three-dimensional object. Known examples thereof include the Additive Manufacturing (AM) technique. As one example thereof, Direct Energy Deposition (DED) is available as the AM technique employing the deposition method. DED is a technique that carries out fabrication by melting and solidifying a powdered metal material together with a base material using an appropriate heat source while supplying the powdered metal material locally.

In the case where the three-dimensional object is fabricated by DED, the fabrication is carried out in such a manner that the powder material is melted and solidified by being irradiated with a laser while being supplied to a fabrication position using a DED nozzle. Therefore, in the case where the three-dimensional object is fabricated by DED, the powder material should be kept supplied to the DED nozzle. Generally, the supply of the powder material to the DED nozzle is conducted by supplying the powder material to the DED nozzle together with carrier gas using a powder supply apparatus. The powder supply apparatus can store the powder material therein and supply the powder material to a supply destination such as the DED nozzle by a predetermined supply amount.

CITATION LIST

Patent Literature

PTL 1: Japanese Patent Application Public Disclosure No. 2005-219060

SUMMARY OF INVENTION

Technical Problem

When a large three-dimensional object is fabricated by DED, the fabrication may be unable to be completed using only the powder material prestored in the powder supply apparatus, and therefore the powder material should be replenished into the powder supply apparatus in the middle of the fabrication. The powder material is often replenished into the powder supply apparatus manually because this work necessitates detachment of a component or the like. This means that the fabrication by DED is temporarily interrupted and a longer time is required for the fabrication to replenish the powder material into the powder supply apparatus. In light thereof, it is desirable to allow the powder material to be supplied to the powder supply apparatus not manually but automatically. Further, automatically supplying the powder material to the powder supply apparatus can contribute to reducing a risk that a human inhales the powder material. Further, when the powder material is supplied to the supply destination such as the DED nozzle using the powder supply apparatus together with the carrier gas, a container storing the powder material therein in the powder supply apparatus may be pressurized. Therefore, the powder material may scatter around from the container unless the container storing the powder material therein is appropriately sealed. In light thereof, it is desirable to appropriately seal the container storing the powder material therein. One of objects of the present application is to provide a structure capable of solving or alleviating at least a part of these problems.

Solution to Problem

According to one aspect, a powder supply apparatus is provided. The powder supply apparatus includes a container configured to store powder therein, a supply passage configured to supply the powder to the container therethrough, and a valve mechanism configured to open and close the supply passage thereby. The valve mechanism includes a valve main body movable between a first position, at which the valve main body closes the supply passage, and a second position, at which the valve main body opens the supply passage, and further includes a valve seat configured in such a manner that the valve main body is seated thereon. The valve main body includes a first seal portion and a second seal portion. The valve seat includes a first seat portion on which the first seal portion is seated, and a second seat portion on which the second seal portion is seated. The valve mechanism defines a space sealingly closed when the first seal portion is seated on the first seat portion and the second seal portion is seated on the second seat portion. The valve mechanism includes an exhaust passage configured to exhaust gas from the sealingly closed space therethrough and a pressure monitoring passage configured to be used to monitor a pressure in the sealingly closed space.

DESCRIPTION OF EMBODIMENTS

Figure 1:
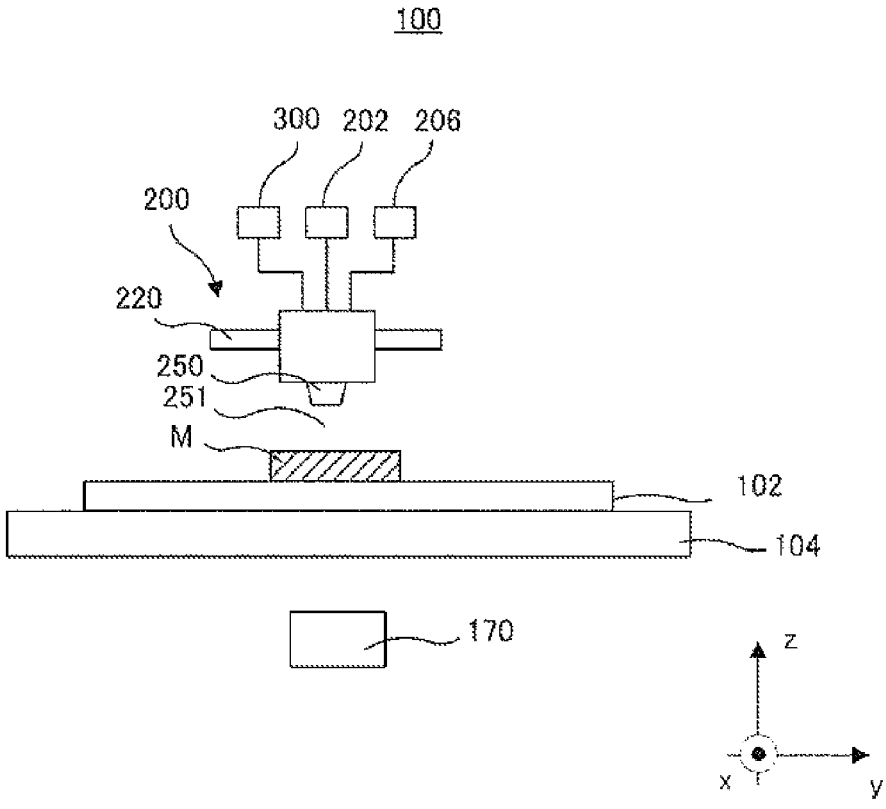
FIG. 1 is a diagram schematically illustrating an AM apparatus for manufacturing a fabrication object according to one embodiment.

In the following description, embodiments of a powder supply apparatus and an AM apparatus using a powder supply apparatus according to the present invention will be described with reference to the attached drawings. In the attached drawings, identical or similar components will be indicated by identical or similar reference numerals, and redundant descriptions regarding the identical or similar components may be omitted in the description of each of the embodiments. Further, features described in each of the embodiments are also applicable to other embodiments in so far as they do not contradict each other.

FIG. 1 is a diagram schematically illustrating an AM apparatus for manufacturing a fabrication object according to one embodiment. As illustrated in FIG. 1, an AM apparatus 100 includes a base plate 102. A fabrication object M is expected to be fabricated on the base plate 102. The base plate 102 can be a plate made from an arbitrary material capable of supporting the fabrication object M. In one embodiment, the base plate 102 is disposed on an XY stage 104. The XY stage 104 is a stage 104 movable in two directions (an x direction and a y direction) perpendicular to each other in a horizontal plane. The XY stage 104 may be coupled with a lift mechanism movable in the height direction (a z direction). Further, in one embodiment, the XY stage 104 may be omitted.

In one embodiment, the AM apparatus 100 includes a DED head 200 as illustrated in FIG. 1. The DED head 200 is connected to a laser source 202, a powder material source 300, and a gas source 206. The DED head 200 includes a DED nozzle 250. The DED nozzle 250 is configured to inject a laser, a powder material, and gas from the laser source 202, the powder material source 300, and the gas source 206, respectively.

The DED head 200 can be an arbitrary DED head, and, for example, a known DED head can be used as it. The DED head 200 is coupled with a movement mechanism 220, and is movably configured. The movement mechanism 220 can be an arbitrary movement mechanism, and, for example, may be a movement mechanism capable of moving the DED head 200 along a specific axis such as a rail or may be formed from a robot capable of moving the DED head 200 to an arbitrary position and in an arbitrary direction. As one embodiment, the movement mechanism 220 can be configured to be able to move the DED head 200 along perpendicular three axes.

The AM apparatus 100 according to one embodiment includes a control device 170 as illustrated in FIG. 1. The control device 170 is configured to control the operations of various kinds of operation mechanisms of the AM apparatus 100, such as the above-described DED head 200 and various kinds of operation mechanisms 220. The control device 170 can be formed by a general computer or a dedicated computer.

Figure 2:
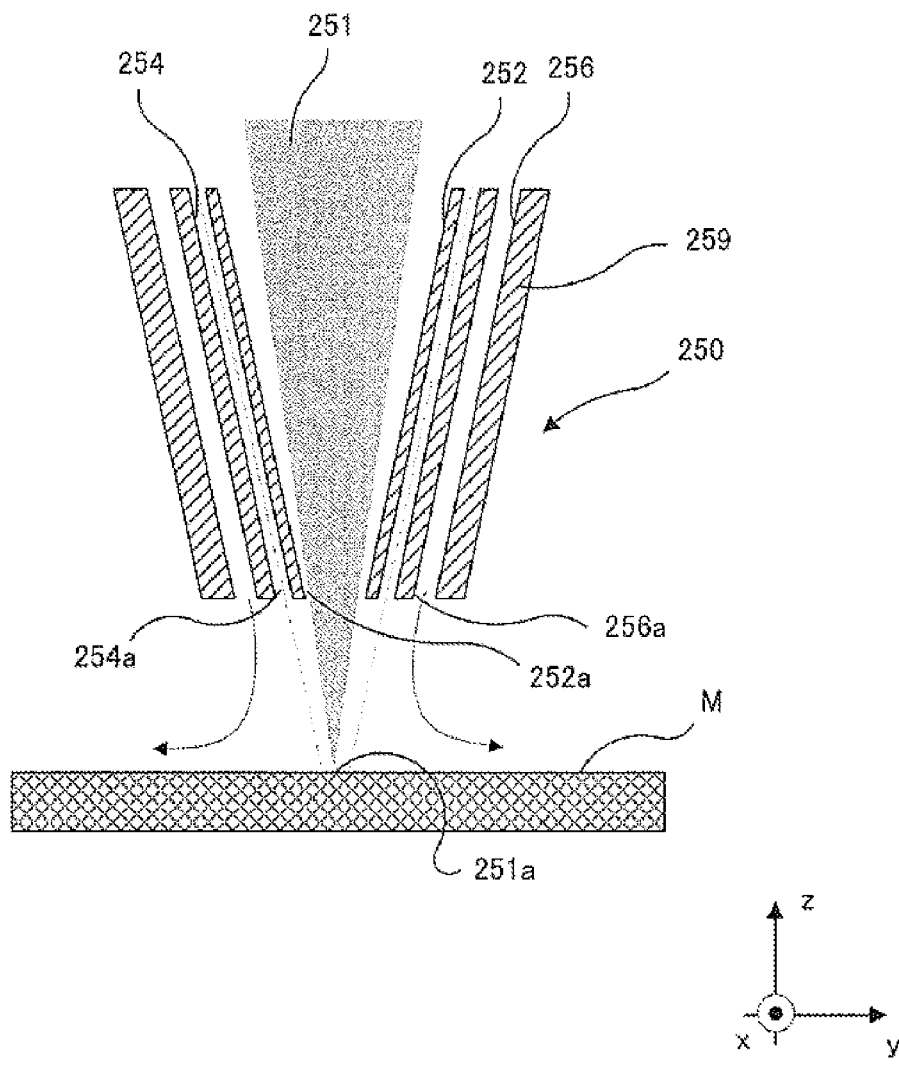
FIG. 2 is a diagram schematically illustrating a cross-section of a DED nozzle according to one embodiment.

FIG. 2 is a diagram schematically illustrating a cross-section of the DED nozzle 250 according to one embodiment. The DED nozzle 250 according to the illustrated embodiment is a DED nozzle main body 259 having a generally truncated conical shape. The DED nozzle 250 according to the illustrated embodiment includes a first passage 252 at the center of the DED nozzle main body 259. A laser 251 passes through the first passage 252. After passing through the first passage 252, the laser is emitted from a laser port 252a of the DED nozzle main body 259. Further, the DED nozzle main body 259 includes a second passage 254 outside the first passage 252. The powder material and carrier gas for transporting the powder material pass through the second passage 254. After passing through the second passage 254, the powder material is emitted from a powder port 254a. Further, the DED nozzle main body 259 includes a third passage 256 outside the second passage 254. Shield gas passes through the third passage 256. After passing through the third passage 256, the shield gas is emitted from a gas port 256a.

The second passage 254 is configured in such a manner that the powder material discharged from the DED nozzle 250 is converged to substantially the same position as a focal point 251a of the laser 251. The flow of the powder material and the carrier gas is indicated by broken lines in FIG. 2. The carrier gas can be inert gas, such as argon gas or nitrogen gas. Argon gas heavier than air is further desirably used as the carrier gas. Using the inert gas as the carrier gas allows a molten pool formed from the melted powder material to be covered with the inert gas, thereby contributing to preventing oxidation thereof. However, due to the flow of the carrier gas emitted from the powder port 254a, air outside it may be entrained therein. In light thereof, the DED nozzle 250 illustrated in FIG. 2 can prevent surrounding air from being entrained by supplying the shield gas at a low speed from the third passage 256 provided outside the second passage 254, from which the powder material and the carrier gas are discharged. Preventing the surrounding air (especially, oxygen) from being entrained by the carrier gas can contribute to preventing a metal oxide film from being generated at the time of the fabrication, and, further, allow a highly wettable molten pool to be formed. The flow of the shield gas is indicated by arrows in FIG. 2.

Figure 3:
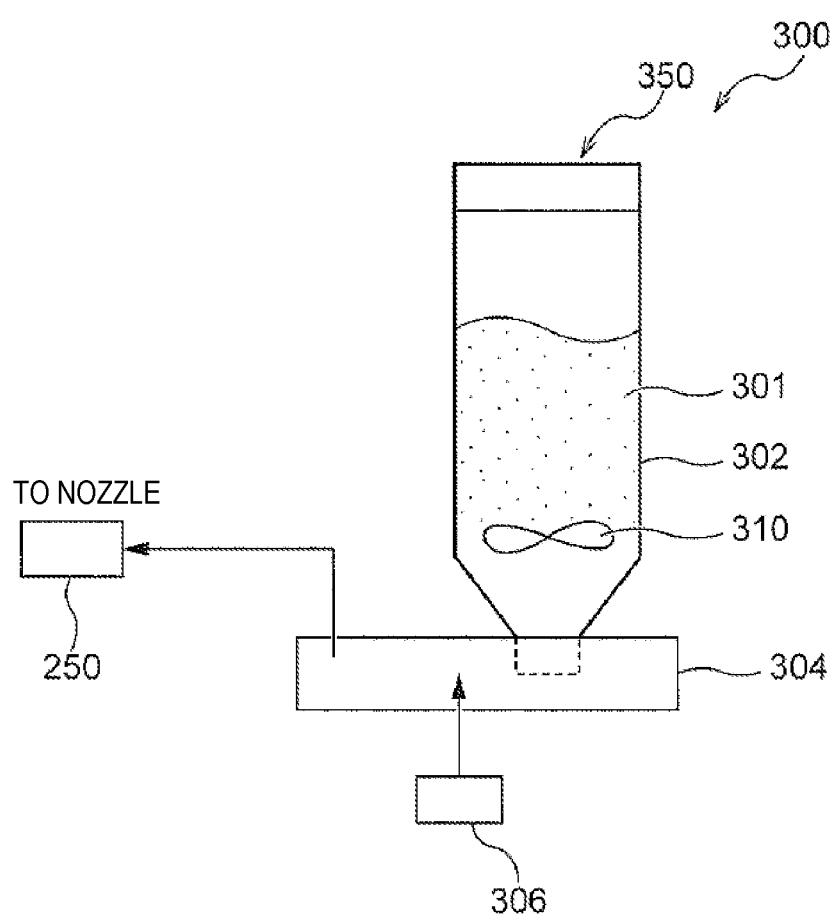
FIG. 3 is a diagram schematically illustrating a powder supply apparatus serving as a powder material source according to one embodiment.

In the case where the fabrication is carried out using the DED nozzle 250 as described above, the powder material should be supplied to the DED nozzle 250. As illustrated in FIG. 1, the powder material source 300 is connected to the DED nozzle 250. FIG. 3 is a diagram schematically illustrating a powder supply apparatus 300 serving as the powder material source 300 according to one embodiment.

As illustrated in FIG. 3, the powder supply apparatus 300 includes a powder container 302 for storing the powder material 301 therein. A cover 350 is attached to the upper end of the powder container 302. The cover 350 may be configured detachably from the powder container 302. In the case where the cover 350 is configured detachably from the powder container 302, the powder supply apparatus 300 may be configured in such a manner that the powder material is replenished into the powder container 302 while the cover 350 is detached. Alternatively, in one embodiment, the powder supply apparatus 300 may be configured in such a manner that the powder material can be replenished with the cover 350 kept attached to the powder container 302, as will be described below. In one embodiment, the powder supply apparatus 300 includes a stirring device 310 disposed in the powder container 302, and is configured to be able to stir the powder material in the powder container 302.

The lower end of the powder container 302 is connected to a weighing device 304. The weighing device 304 is further connected to a gas source 306. The gas source 306 can supply the carrier gas such as argon gas to the weighing device 304. The same gas source as the gas source 206 illustrated in FIG. 1 may be used as the gas source 306. The powder material supplied from the powder container 302 to the weighing device 304 is weighed, and is transmitted to the DED nozzle 250 together with the carrier gas.

Figure 4:
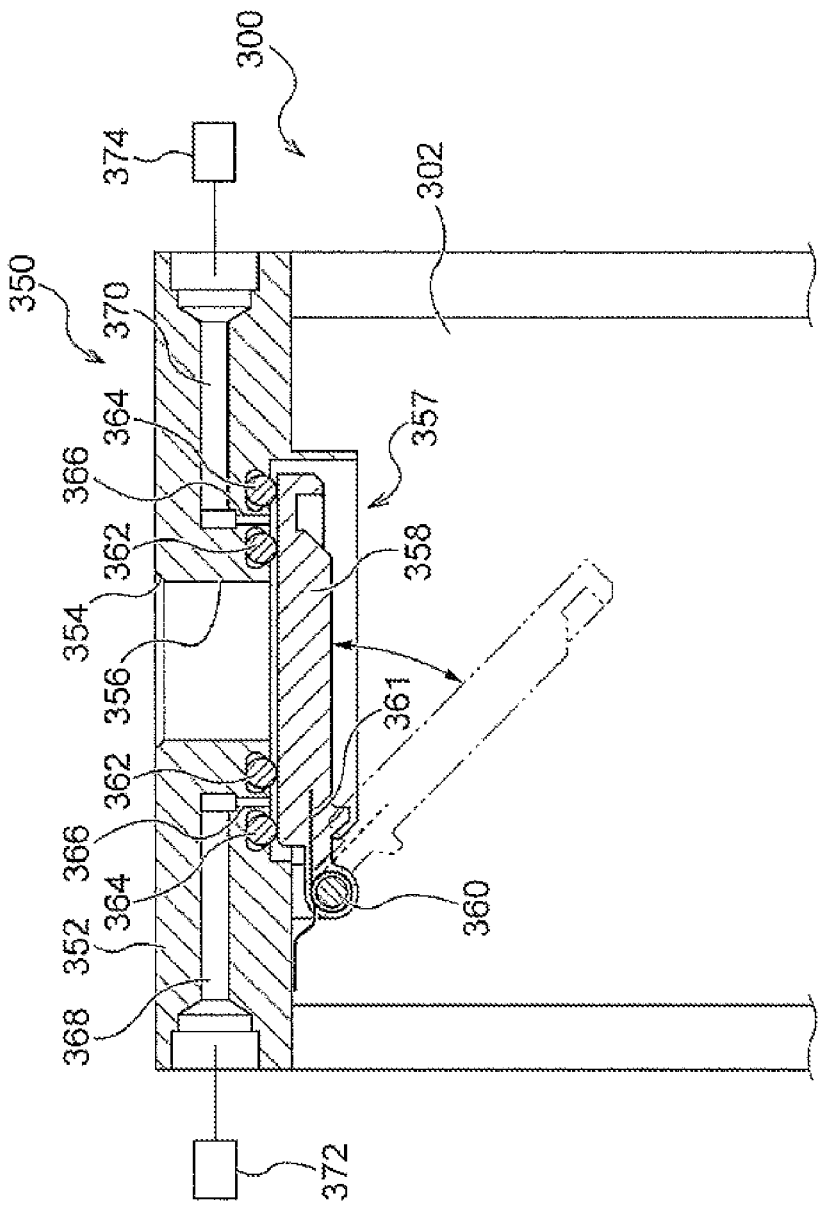
FIG. 4 is a cross-sectional view schematically illustrating a structure of a cover attached to the upper end of a powder container according to one embodiment.
Figure 5:
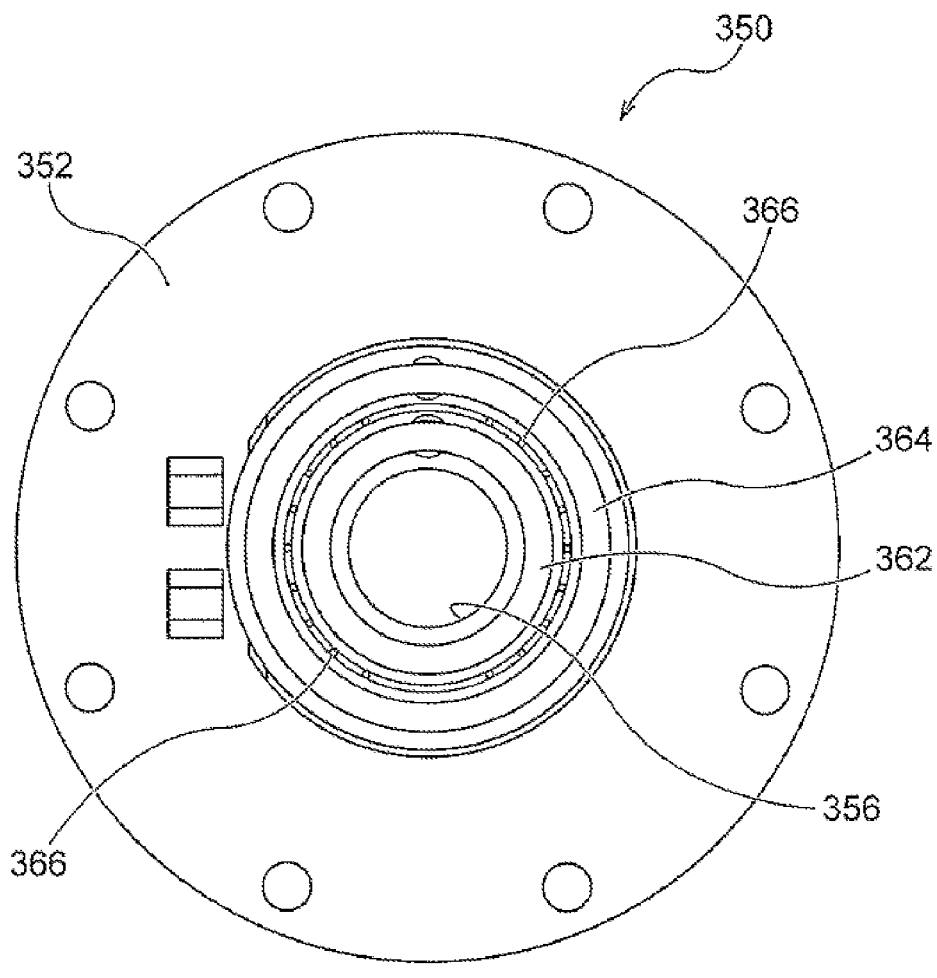
FIG. 5 is a diagram illustrating the cover illustrated in FIG. 4 as viewed from below.

FIG. 4 is a cross-sectional view illustrating a structure of the cover 350 attached to the upper end of the powder container 302 according to one embodiment. FIG. 5 is a diagram illustrating the cover 350 illustrated in FIG. 4 as viewed from below. The cover 350 according to the illustrated embodiment is fixed to the upper end of the powder container 302 using a not-illustrated bolt or the like. The cover 350 includes a cover main body 352. In one embodiment, the powder container 302 is an approximately cylindrical container, and the cover main body 352 has a generally disk-like shape. A supply port 354 is formed at the center of the cover main body 352, and a supply passage 356 is defined so as to extend through the cover main body 352 from the supply port 354.

In one embodiment, the cover 350 includes a valve structure 357 for opening and closing the supply passage 356 as illustrated in FIG. 4. The valve structure 357 includes a valve main body 358. The valve main body 358 is rotationally movably supported using a pin 360. A first O-ring 362 is attached on the lower surface of the cover main body 352. Further, a second O-ring 364 is attached outside the first O-ring 362 on the lower surface of the cover main body 352. FIG. 5 illustrates the cover 350 with the valve 357 omitted.

The valve main body 358 is configured rotationally movably about the pin 360 between a first position, at which the upper surface thereof is in contact with the first O-ring 362 and the second O-ring 364, and a second position, at which the upper surface thereof is separated from the first O-ring 362 and the second O-ring 364. When the valve main body 358 is located at the first position, the supply passage 356 is closed by the valve main body 358. On the other hand, when the valve main body 358 is located at the second position, the supply passage 356 is opened and the powder material can be loaded into the powder container 302 via the supply port 354 and the supply passage 356. In the embodiment illustrated in FIG. 4, the first O-ring 362 and the second O-ring 364 form a valve seat on which the valve main body 358 is seated. A portion of the valve main body 358 in contact with the first O-ring at the first position forms a first seal portion, and a portion of the valve main body 358 in contact with the second O-ring 364 at the first position forms a second seal portion. Further, the first O-ring 362 forms a first seat portion, and the second O-ring 364 forms a second seat portion. The first O-ring 362 and the second O-ring 364 are provided on the lower surface of the cover main body 352 in the embodiment illustrated in FIG. 4, but the powder supply apparatus 300 may be configured in such a manner that the first O-ring 362 and the second O-ring 364 are provided on the upper surface of the valve main body 358 as one embodiment.

Figure 6:
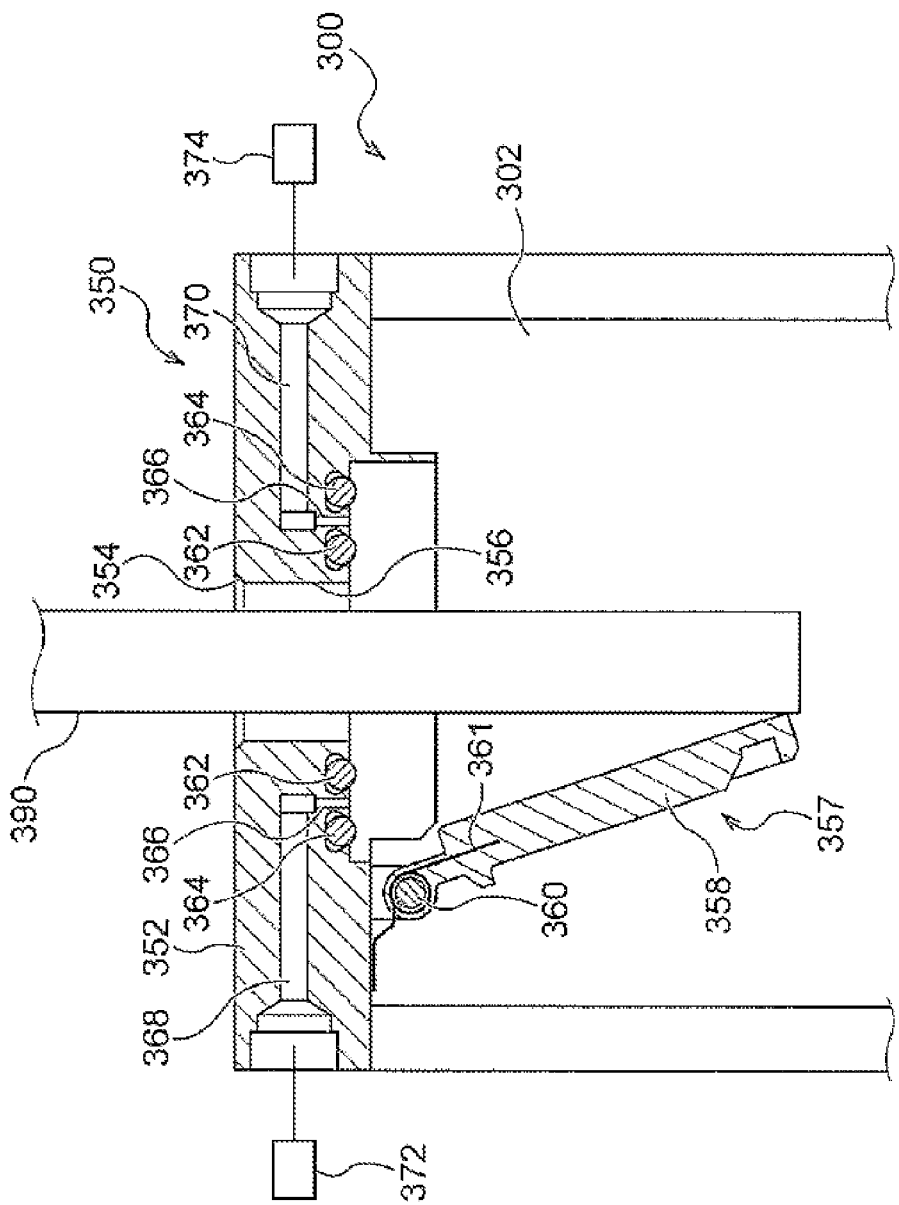
FIG. 6 is a diagram illustrating a supply passage of the cover illustrated in FIG. 4 in an opened state.

The powder supply apparatus 300 according to this embodiment allows the powder material to be loaded from the supply port 354 and the supply passage 356 into the powder container 302 via the valve structure without requiring a removal of the cover 350. For example, the powder material can be replenished into the powder container 302 by inserting, for example, a tube 390 for loading the powder material (refer to FIG. 6 and the like) into the supply port 354 and the supply passage 356. The powder material can be automatically supplied to the powder supply apparatus 300 by automatically and/or remotely operating the tube 390 for loading the powder material using a robot or the like. In the fabrication using the AM apparatus, humans may be prohibited from entering a fabrication chamber during the fabrication from a safety perspective. Therefore, if the powder material can be replenished into the powder supply apparatus 300 not manually but automatically, the powder material can be replenished into the powder supply apparatus 300 without interrupting the fabrication, and the efficiency increases. Further, the powder supply apparatus 300 according to this embodiment allows the powder material to be supplied to the powder supply apparatus 300 without manual intervention, therefore being also desirable in terms of safety.

In one embodiment, the valve structure 357 can include an elastic member 361, which biases the valve main body 358 toward the first position. In one embodiment, the elastic member 361 can be a torsion spring such as the example illustrated in FIGS. 4 and 6. The torsion spring is disposed while being wound around the pin 360. The provision of the elastic member 361 leads to the valve main body 358 kept positioned at the first position where the valve main body 358 closes the supply passage 356 unless a force for opening the supply passage 356 is applied thereto. Therefore, the valve main body 358 is prevented from being opened accidentally and the powder material in the powder container 302 is prevented from being discharged from the supply passage 356. When the powder material is loaded into the powder container 302, the powder material can be loaded into the powder container 302 by inserting the cylindrical tube 390 like the example illustrated in FIG. 6 from the supply port 354 into the supply passage 356 to move the valve main body 358 to the second position to open the supply passage 356, and supplying the powder material from the tube 390. In the case where the elastic member 361 is used, the tube 390 allows the valve main body 358 to be rotationally moved from the first position to the second position by pushing down the valve main body 358, and the valve main body 358 can close the supply passage 356 by being automatically returned to the first position due to the function of the elastic member 361 when the tube 390 is pulled out. According to this embodiment, the valve 357 can be automatically opened by inserting the tube 390 into the supply passage 356, and the valve 357 can be automatically closed by extracting the tube 390 from the supply passage 356.

As illustrated in FIG. 4, a ring-shaped groove 366 is formed on the cover main body 352 between the first O-ring 362 and the second O-ring 364. As illustrated in FIG. 4, an exhaust passage 368, which extends to a side surface of the cover main body 352, is formed in the ring-shaped groove 366. The exhaust passage 368 is connected to a vacuum pump 372. Further, a pressure monitoring passage 370, which extends to an opposite side surface of the cover main body 352, is further formed in the ring-shaped groove 366. The pressure monitoring passage 370 is connected to a pressure gauge 374. A leak between the cover main body 352 and the first O-ring 362 and the second O-ring 364 can be detected by evacuating the ring-shaped groove 366 via the exhaust passage 368 and monitoring the pressure in the ring-shaped groove 366 via the pressure monitoring passage 370 when the valve main body 358 is disposed at the first position and the supply passage 356 is closed.

In the above-described embodiment, whether the supply passage 356 can be securely closed by the valve main body 358 can be checked by monitoring the pressure in the ring-shaped groove 366 formed between the first O-ring 362 and the second O-ring 364. The powder material can be prevented from scattering around by controlling the powder supply apparatus 300 so as to start supplying the powder material therefrom only when the supply passage 356 can be securely closed by the valve main body 358.

Figure 7:
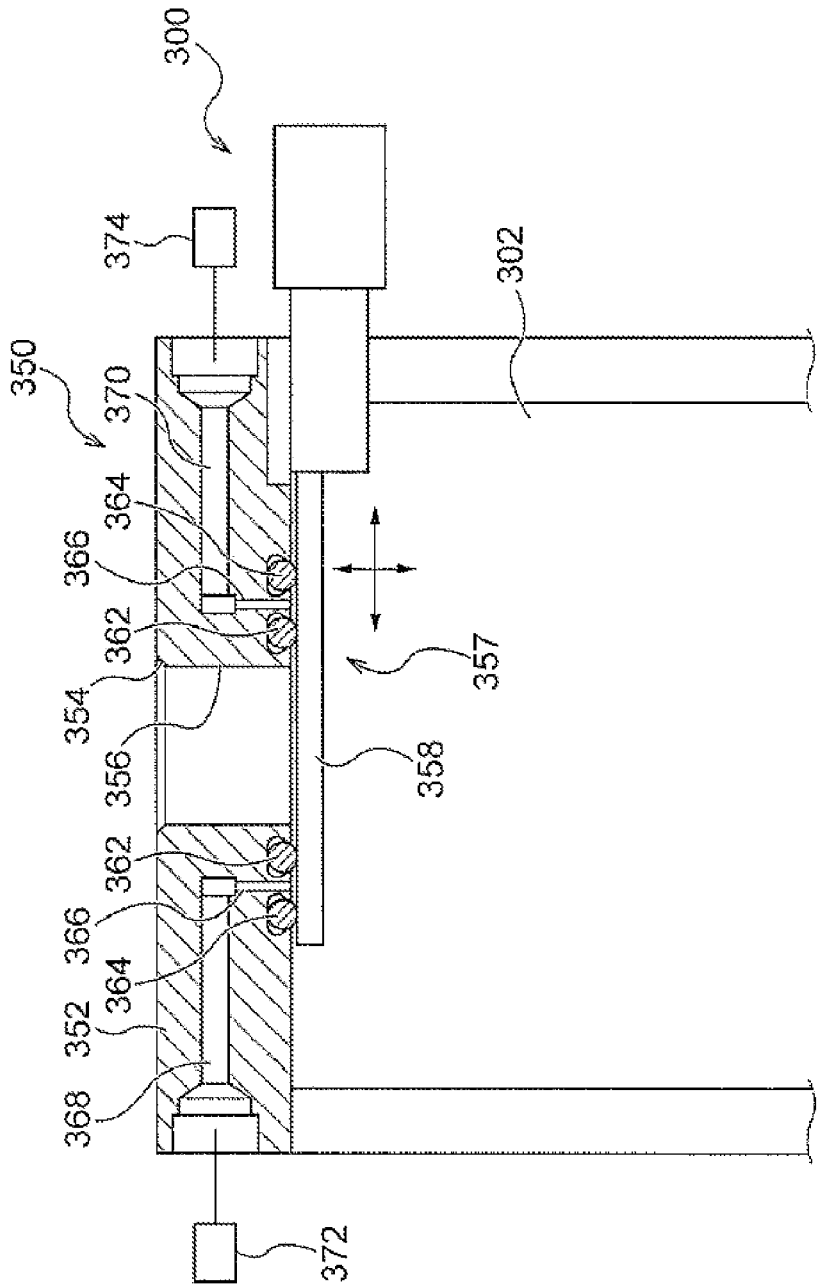
FIG. 7 is a cross-sectional view schematically illustrating a structure of the cover attached to the upper end of the powder container according to one embodiment.

FIG. 7 is a cross-sectional view illustrating a structure of the cover 350 attached to the upper end of the powder container 302 according to one embodiment. The cover 350 according to the embodiment illustrated in FIG. 7 can be the same as the cover 350 illustrated in FIG. 4 except for the valve structure 357, which opens and closes the supply passage 356. In the valve structure 357 according to the embodiment illustrated in FIG. 7, the valve main body 358 is configured movably in a planar direction of the cover 350 and a direction perpendicular to the planar direction. In the embodiment illustrated in FIG. 7, the valve main body 358 is configured movably between a first position, at which the upper surface thereof is in contact with the first O-ring 362 and the second O-ring 364, and a second position, at which the upper surface thereof is separated from the first O-ring 362 and the second O-ring 364. When the valve main body 358 is located at the first position, the supply passage 356 is closed by the valve main body 358. On the other hand, when the valve main body 358 is located at the second position, the supply passage 356 is opened and the powder material can be loaded into the powder container 302 via the supply port 354 and the supply passage 356. The first O-ring 362 and the second O-ring 364 are also provided on the lower surface of the cover main body 352 in the embodiment illustrated in FIG. 7, but the powder supply apparatus 300 may be configured in such a manner that the first O-ring 362 and the second O-ring 364 are provided on the upper surface of the valve main body 358 as one embodiment. The embodiment illustrated in FIG. 7 can also achieve advantageous effects similar to the embodiments described with reference to FIGS. 4 to 6.

Figure 8:
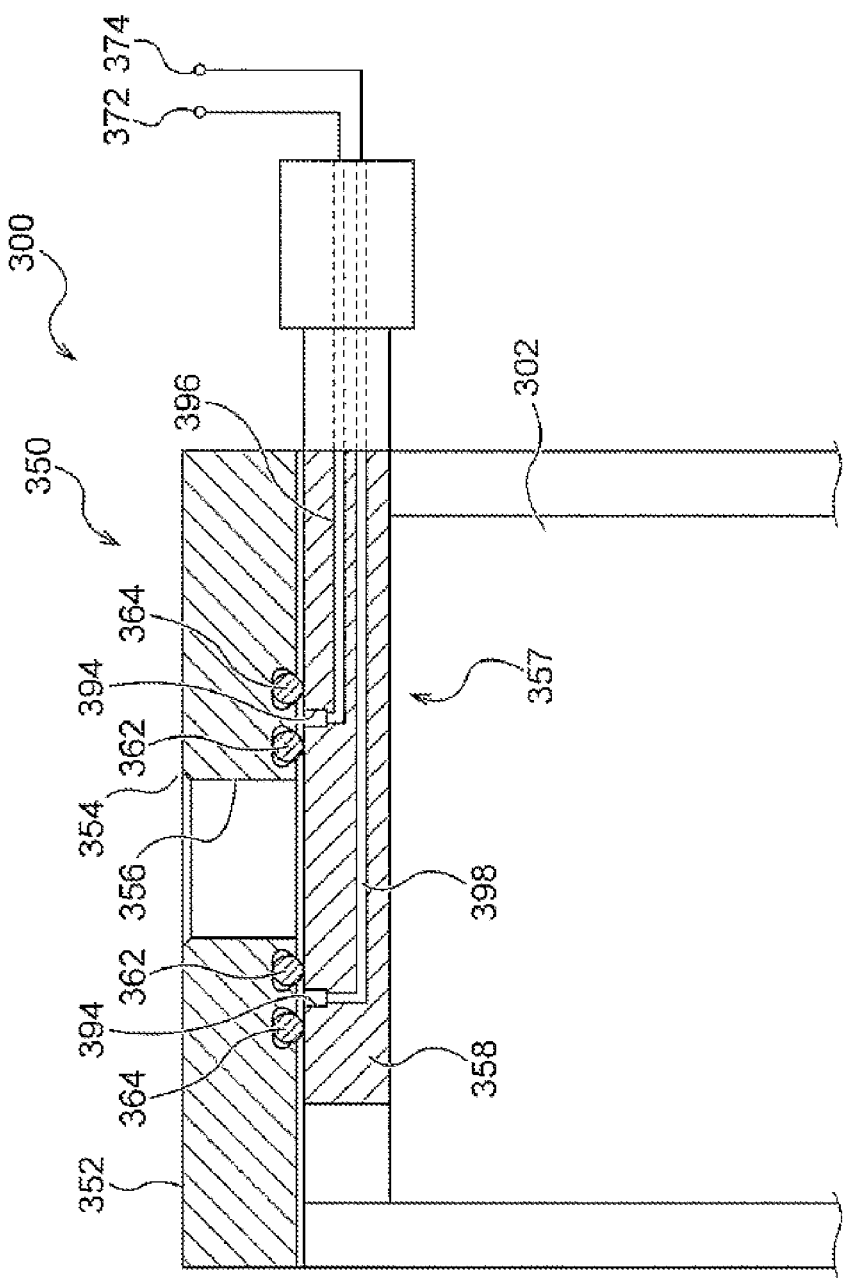
FIG. 8 is a cross-sectional view schematically illustrating a structure of the cover attached to the upper end of the powder container according to one embodiment.

FIG. 8 is a cross-sectional view illustrating a structure of the cover 350 attached to the upper end of the powder container 302 according to one embodiment. The cover 350 according to the embodiment illustrated in FIG. 8 is structured similarly to the cover 350 illustrated in FIG. 7, but the ring-shaped groove 366, the exhaust passage 368, and the pressure monitoring passage 370 are not provided on the cover main body 352. In the embodiment illustrated in FIG. 8, a ring-shaped groove 394 is formed between a position of the valve main body 358 with which the first O-ring 362 (the first seat portion) is in contact (the first seal portion), and a position of the valve main body 358 with which the second O-ring 364 (the second seat portion) is in contact (the second seal portion). As illustrated in FIG. 8, an exhaust passage 396, which extends to a side surface of the valve main body 358, is formed in the ring-shaped groove 394 formed on the valve main body 358. The exhaust passage 396 is connected to the vacuum pump 372. Further, a pressure monitoring passage 398, which extends to the side surface of the valve main body 358, is further formed in the ring-shaped groove 394. The pressure monitoring passage 398 is connected to the pressure gauge 374. A leak between the valve main body 358 and the first O-ring 362 and the second O-ring 364 can be detected by evacuating the ring-shaped groove 394 via the exhaust passage 396 and monitoring the pressure in the ring-shaped groove 394 via the pressure monitoring passage 398 when the valve main body 358 is located at the first position and the supply passage 356 is closed. The first O-ring 362 and the second O-ring 364 are also provided on the lower surface of the cover main body 352 in the embodiment illustrated in FIG. 8, but the powder supply apparatus 300 may be configured in such a manner that the first O-ring 362 and the second O-ring 364 are provided on the upper surface of the valve main body 358 as one embodiment. The embodiment illustrated in FIG. 8 can also achieve advantageous effects similar to the embodiments described with reference to FIGS. 4 to 7.

Figure 9:
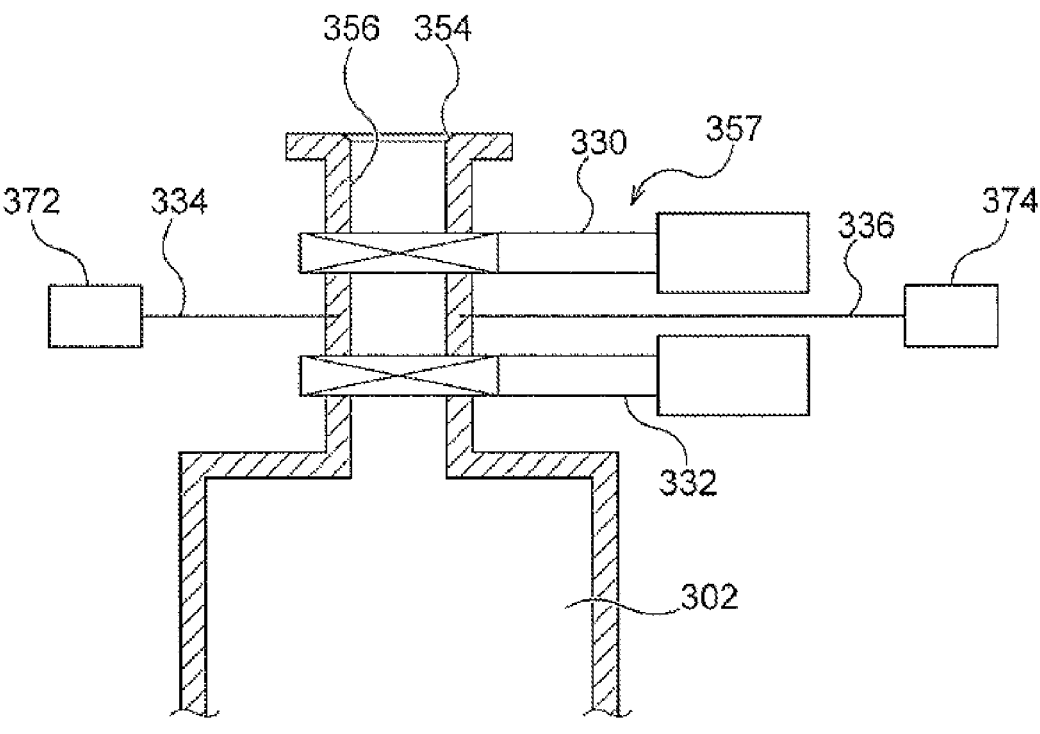
FIG. 9 is a cross-sectional view schematically illustrating a structure around the supply passage of the powder container according to one embodiment.

FIG. 9 is a cross-sectional view schematically illustrating a structure around the supply passage 356 of the powder container 302 according to one embodiment. In the embodiment illustrated in FIG. 9, a first valve 330 for opening and closing a first position, and a second valve 332 for opening and closing a second position are provided in the supply passage 356 of the powder container 302. In the embodiment illustrated in FIG. 9, an exhaust line 334 for evacuation is connected to a space between the first position and the second position of the supply passage 356. The exhaust line 334 is connected to the vacuum pump 372. Further, a pressure monitoring line 336 for monitoring the pressure is further connected to the space between the first position and the second position of the supply passage 356. The pressure monitoring passage 336 is connected to the pressure gauge 374. A leak from the first valve 330 and the second valve 332 can be checked by evacuating the space between the two valves via the exhaust line 334 and monitoring the pressure via the pressure monitoring line 336 when the first valve 330 and the second valve 332 are closed. The embodiment illustrated in FIG. 9 can also achieve advantageous effects similar to the embodiments described with reference to FIGS. 4 to 8.

Figure 10:
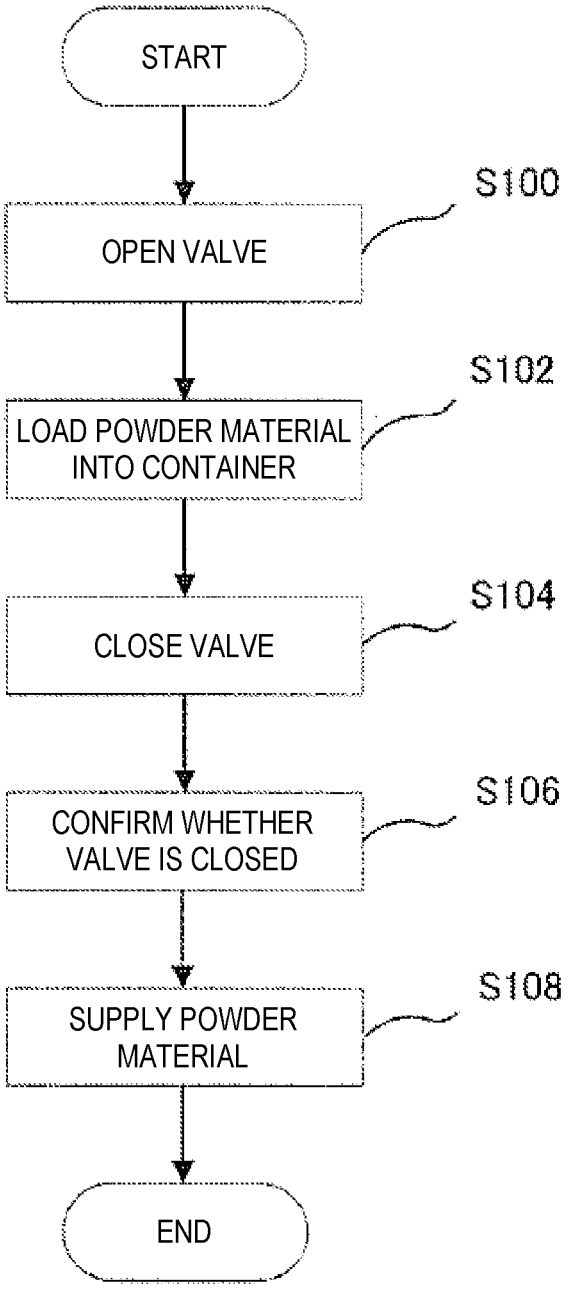
FIG. 10 is a flowchart illustrating a method for supplying a powder material from a powder supply apparatus according to one embodiment.

FIG. 10 is a flowchart illustrating a method for supplying a powder material from a powder supply apparatus according to one embodiment. In the embodiment illustrated in FIG. 10, the powder supply apparatus 300 according to an arbitrary one of the above-described embodiments or another arbitrary powder supply apparatus can be used as the powder supply apparatus.

In the method for supplying the powder material according to one embodiment, first, the valve is opened to load the powder material into the powder supply apparatus (S100). In the case of the powder supply apparatus 300 according to the embodiments illustrated in FIGS. 4 to 6, the valve of the powder supply apparatus 300 can be opened by inserting the tube 390 into the supply passage 356 via the supply port 354 to thus rotate the valve main body 358. It is desirable to insert the tube 390 by an automatic operation and/or a remote operation using a robot or the like. In the case of the powder supply apparatus 300 according to the embodiments illustrated in FIGS. 7 and 8, the supply passage 356 can be opened by moving the valve main body 358 downward and laterally. In the case of the powder supply apparatus 300 according to the embodiment illustrated in FIG. 9, the supply passage 356 can be opened by opening both the first valve 330 and the second valve 332. It is also desirable to open the valve without manual intervention with the aid of an electric or electromagnetic effect in the powder supply apparatuses 300 illustrated in FIGS. 7 to 9.

After the valve is opened, the powder material is loaded into the powder container 302 of the powder supply apparatus 300 (S102). The powder material is loaded by, for example, inserting the tube 390 and supplying the powder material into the powder container 302 via inside the tube 390. When the powder material is loaded into the powder container 302, it is desirable to prevent the powder from being attached to the seal portions on the upper surface of the valve main body 358 and the seat portions such as the O-rings. Therefore, in the case where the powder material is supplied by inserting the tube 390, it is desirable to supply the powder material into the powder container 302 after creating such a state that the lower end of the tube 390 is located on the lower side with respect to the valve main body 358.

After the powder material is loaded into the powder container 302, the valve of the powder supply apparatus 300 is closed (S104). In the case where the elastic member 361 is provided like the embodiments illustrated in FIGS. 4 to 6, the valve main body 358 automatically closes the supply passage 356 when the tube 390 is pulled out from the supply passage 356. In the case of the powder supply apparatus 300 according to the embodiments illustrated in FIGS. 7 and 8, the supply passage 356 is closed by moving the valve main body 358 to the first position after pulling out the tube 390 from the supply passage 356. In the case of the powder supply apparatus 300 according to the embodiment illustrated in FIG. 9, the supply passage 356 can be closed by closing both the first valve 330 and the second valve 332.

After the valve of the powder supply apparatus 300 is closed, whether the valve is closed is confirmed (S106). In the case of the powder supply apparatus 300 according to the embodiments illustrated in FIGS. 4 to 8, the ring-shaped groove 366 or 394 is evacuated via the exhaust passage 368 or 396, and the pressure in the ring-shaped groove 366 or 394 is measured via the pressure monitoring passage 370 or 398. If the pressure in the ring-shaped groove 366 or 394 is sufficiently low, the powder supply apparatus 300 is determined to be sealed appropriately by the valve main body 358 and the O-rings 362 and 364. If the pressure in the ring-shaped groove 366 or 394 is higher than a predetermined value, the powder supply apparatus 300 is determined not to be sealed appropriately by the valve main body 358 and the O-rings 362 and 364. If being not sealed appropriately, the powder supply apparatus 300 should be subjected to maintenance such as cleaning of the valve mechanism or a replacement of a component.

After the closing of the valve is confirmed, the powder material is supplied from the powder supply apparatus 300 to an intended location. For example, the powder material can be supplied from the powder supply apparatus 300 to the DED nozzle 250 of the AM apparatus 100.

The method according to the above-described embodiment includes confirming whether the valve is closed before supplying the powder material to the intended location, thereby being able to prevent the powder material from leaking out from the supply passage 356 or the like during the supply of the powder material.

At least the following technical ideas can be recognized from the above-described embodiments.

[Configuration 1] According to a configuration 1, a powder supply apparatus is provided. The powder supply apparatus includes a container configured to store powder therein, a supply passage configured to supply the powder to the container therethrough, and a valve mechanism configured to open and close the supply passage thereby. The valve mechanism includes a valve main body movable between a first position, at which the valve main body closes the supply passage, and a second position, at which the valve main body opens the supply passage, and further includes a valve seat configured in such a manner that the valve main body is seated thereon. The valve main body includes a first seal portion and a second seal portion. The valve seat includes a first seat portion on which the first seal portion is seated, and a second seat portion on which the second seal portion is seated. The valve mechanism defines a space sealingly closed when the first seal portion is seated on the first seat portion and the second seal portion is seated on the second seat portion. The valve mechanism includes an exhaust passage configured to exhaust gas from the sealingly closed space therethrough and a pressure monitoring passage configured to be used to monitor a pressure in the sealingly closed space.

[Configuration 2] According to a configuration 2, in the powder supply apparatus according to the configuration 1, the supply passage is configured to be able to allow a tube for supplying the powder to the container to be inserted therein.

[Configuration 3] According to a configuration 3, in the powder supply apparatus according to the configuration 1 or 2, the first seat portion includes a first O-ring and the second seat portion includes a second O-ring.

[Configuration 4] According to a configuration 4, in the powder supply apparatus according to any one of the configurations 1 to 3, the valve main body is supported using a pin rotationally movably between the first position, at which the valve main body closes the supply passage, and the second position, at which the valve main body opens the supply passage.

[Configuration 5] According to a configuration 5, the powder supply apparatus according to the configuration 4 further includes an elastic member configured to bias the valve main body toward the first position.

[Configuration 6] According to a configuration 6, a powder supply apparatus is provided. The power supply apparatus includes a container configured to store powder therein, a supply passage configured to supply the powder to the container therethrough, a first valve configured to open and close a first position of the supply passage thereby, a second valve configured to open and close a second position of the supply passage thereby, an exhaust passage configured to exhaust gas therethrough from a space between the first position and the second position of the supply passage, and a pressure measurement passage configured to be used to measure a pressure in the space between the first position and the second position of the supply passage.

[Configuration 7] According to a configuration 7, a method for supplying a powder material from a powder supply apparatus is provided. The powder supply apparatus includes a container configured to store powder therein, a supply passage configured to supply the powder to the container therethrough, and a valve configured to open and close the supply passage thereby. The method includes steps of opening the valve, loading the powder material into the container via the supply passage, closing the valve, confirming whether the valve is closed, and supplying the powder material from the powder supply apparatus after confirming that the valve is closed.

[Configuration 8] According to a configuration 8, an AM apparatus configured to manufacture a fabrication object is provided. The AM apparatus includes a DED nozzle. The DED nozzle includes a laser port provided at a distal end of the DED nozzle and configured to emit laser light therefrom, a laser passage provided in communication with the laser port and configured to allow the laser light to pass through inside the DED nozzle, a powder port provided at the distal end of the DED nozzle and configured to inject a powder material therefrom, and a powder passage provided in communication with the powder port and configured to allow the powder material to pass through inside the DED nozzle. The AM apparatus further includes the powder supply apparatus configured to supply the powder material to the DED nozzle according to any one of the configurations 1 to 6.

REFERENCE SIGNS LIST

100 AM apparatus
300 powder supply apparatus
301 powder material
302 powder container
304 weighing device
306 gas source
310 stirring device
330 first valve
332 second valve
334 exhaust line
336 pressure monitoring line
350 cover
352 cover main body
354 supply port
356 supply passage
357 valve mechanism
358 valve main body
360 pin
362 first O-ring
364 second O-ring
366 ring-shaped groove
368 exhaust passage
370 pressure monitoring passage
372 vacuum pump
374 pressure gauge
390 tube
394 ring-shaped groove
396 exhaust passage
398 pressure monitoring passage

What is claimed is:

1. A powder supply apparatus comprising:
a container configured to store powder therein;
a supply passage configured to supply the powder to the container therethrough; and
a valve mechanism configured to open and close the supply passage thereby,
wherein the valve mechanism includes a valve main body movable between a first position, at which the valve main body closes the supply passage, and a second position, at which the valve main body opens the supply passage, and further includes a valve seat configured in such a manner that the valve main body is seated thereon,
wherein the valve main body includes a first seal portion and a second seal portion, wherein the valve seat includes a first seat portion on which the first seal portion is seated, and a second seat portion on which the second seal portion is seated,
wherein the valve mechanism defines a space sealingly closed when the first seal portion is seated on the first seat portion and the second seal portion is seated on the second seat portion, the sealingly closed space being defined between the first seat portion and the second seat portion, and
wherein the valve mechanism includes an exhaust passage configured to exhaust gas from the sealingly closed space therethrough and a pressure monitoring passage configured to be used to monitor a pressure in the sealingly closed space.

2. The powder supply apparatus according to claim 1, wherein the supply passage is configured to be able to allow a tube for supplying the powder to the container to be inserted therein.

3. The powder supply apparatus according to claim 1, wherein the first seat portion includes a first O-ring and the second seat portion includes a second O-ring.

4. The powder supply apparatus according to claim 1, wherein the valve main body is supported using a pin rotationally movably between the first position, at which the valve main body closes the supply passage, and the second position, at which the valve main body opens the supply passage.

5. The powder supply apparatus according to claim 4, further comprising an elastic member configured to bias the valve main body toward the first position.

6. An AM apparatus configured to manufacture a fabrication object, the AM apparatus comprising:
a DED nozzle, the DED nozzle including
a laser port provided at a distal end of the DED nozzle and configured to emit laser light therefrom, and a laser passage provided in communication with the laser port and configured to allow the laser light to pass through inside the DED nozzle, and
a powder port provided at the distal end of the DED nozzle and configured to inject a powder material therefrom, and a powder passage provided in communication with the powder port and configured to allow the powder material to pass through inside the DED nozzle;
the AM apparatus further comprising the powder supply apparatus configured to supply the powder material to the DED nozzle according to claim 1.

* * * * *